United States Patent [19]

Moore

[11] Patent Number: 5,449,394
[45] Date of Patent: Sep. 12, 1995

[54] NONPOLYMERIC CONDENSED AMMONIA, UREA, FORMALDEHYDE LIQUID FERTILIZER

[75] Inventor: William P. Moore, Hopewell, Va.

[73] Assignee: Coron Corporation, Souderton, Pa.

[21] Appl. No.: 217,732

[22] Filed: Mar. 25, 1994

[51] Int. Cl.$^6$ ............................................. C05C 9/02
[52] U.S. Cl. ................................. 71/30; 71/64.11
[58] Field of Search ................................. 71/28–30, 71/64.11

[56] References Cited

U.S. PATENT DOCUMENTS 4,554,005 11/1985 Hawkins ............................ 71/30
4,781,749 11/1988 Moore ............................... 71/28

OTHER PUBLICATIONS

Non-Polymeric Condensation Products in Ureaform liquids, Thomas P. Murray, Div of Fertilizer and Soil Chemistry, 204th American Chemical Society Meeting, Aug. 27, 1992.

*Primary Examiner*—Ferris Lander

[57] ABSTRACT

A method of preparing liquid nonpolymeric controlled release nitrogen plant food composition by the condensation reaction of about one molecule ammonia, about two molecules of urea, and about three molecules of formaldehyde in base buffered aqueous solution at a minimum pH of 7 and a temperature of about 100° C. and concentrating by evaporation until nitrogen concentration is between 20 and 30 percent before formation of polymers containing more than 3 urea moieties occurs. The new nonpolymeric aqueous liquid controlled release nitrogen plant food composition prepared exhibits high storage stability, low phytotoxicity, high nitrogen availability to plants, and contains less than 6 percent unreacted urea nitrogen, less than 1 percent unreacted ammonia nitrogen, and contains large amounts of 5-methyleneuriedo-2-oxohexahydro-s-triazine.

15 Claims, No Drawings

NONPOLYMERIC CONDENSED AMMONIA, UREA, FORMALDEHYDE LIQUID FERTILIZER

BACKGROUND OF THE INVENTION

1. Field of the Invention

This invention relates to liquid controlled release nitrogn fertilizers produced from ammonia, urea, and formaldehyde. More particularly, it relates to a new method using high reaction temperature, low reaction basicity, and a high ammonia molecular ratio for preparing aqueous liquid nonpolymeric controlled release nitrogen fertilizer, exhibiting low phytotoxicity because the condensation reaction is substantially complete, leaving almost no unreacted ammonia, urea, and formaldehyde.

2. Description of the Prior Art

Urea formaldehyde condensation polymers have been used for a long time to provide fertilizers which release slowly to feed growing plants. These polymer products when prepared with low free urea contents contain large amounts of high molecular weight polymers which do not release their nitrogen contents in a timely and predictable pattern as needed to safely and efficiently feed plants. Liquid urea formaldehyde products disclosed heretofore in addition to methylene urea polymers also contain substantial amounts of unreacted urea, and ammonia which cause chlorosis and damage to plants fertilized. Damage is particularly severe when nitrogen liquids containing substantial amounts of unreacted urea and ammonia are applied on the foliage of plants.

In the past hexamethylene tetramine, formed by the condensation reaction of formaldehyde and ammonia, containing no urea and little free ammonia, was tried as a nitrogen foliar feed, and was found to exhibit phytotoxicity to the foliage of plants. A condensation reaction is defined as a reaction combining two or more molecules by splitting out water.

In U.S. Pat. No. 4,554,005, Hawkins disclosed a method of preparing a storage stable urea formaldehyde based nitrogen fertilizer solution by reacting urea, formaldehyde, and ammonia in the presence of aqueous caustic in a molecular ratio of between 2 and 1, 1, and between 0.2 and 0.38, at a temperature between 85° and 95° C., for between 55 and 120 minutes in two stages. The composition disclosed by Hawkins contained substantial amounts of s-triazine and unreacted urea.

Moore, in U.S. Pat. No. 4,781,749, disclosed the preparation of storage stable aqueous liquid polymethylene urea by reaction of urea, formaldehyde, and ammonia in a molecular ratio of between 1.3 and 1.5, 1, and between 0.25 and 0.30 in a two stage method carried out at near boiling temperatures with sufficient buffering agent to maintain near neutral conditions. The liquid product contained primarily water soluble polymethylene ureas, unreacted urea, methylolurea, methylene diurea, and unreacted ammonia.

Thomas P. Murray disclosed the isolation of 5-methyleneuriedo-2-oxohexahydro-s-triazine, a nonpolymeric condensed urea, ammonia, formaldehyde reaction product in liquid controlled release nitrogen fertilizers. He also provided a high performance liquid chromatography (HPLC) analytical method for its quantitative analysis. Products analyzed by Murray contained between 19 and 31 percent of the aforementioned compound and substantial amounts of unreacted urea.

It has long been a goal in the art to produce a storage stable, controlled releasing liquid fertilizer and foliar feed with complete nitrogen availability and a low degree of phytotoxicity. To achieve these goals, it is necessary to prepare a liquid wherein the ammonia, urea, and formaldehyde are substantially condensed into a nonpolymeric water soluble liquid substantially free of unreacted ammonia, urea, and formaldehyde.

OBJECTS OF THE INVENTION

A primary object of this invention is to overcome the phytotoxicity problem in liquid nitrogen plant foods cited in the prior art, caused by substantial concentrations of unreacted urea and ammonia, by providing a new and effective method for substantially reacting ammonia, urea, and formaldehyde to form a storage stable aqueous liquid, nonpolymeric, controlled release, nitrogen plant food.

A further object of this invention is to provide the closely controlled conditions whereby the new method may be effectively carried out.

A further object is to provide a method for preparing a nonpolymeric aqueous liquid nitrogen plant food wherein a majority of the nitrogen is derived from the ammonia, urea formaldehyde condensation compound, 5-methyleneuriedo-2-oxohexahydro-s-triazine.

A further object of the invention is to provide a new storage stable nonpolymeric aqueous liquid nitrogen plant food exhibiting low phytotoxicity and controlled release of its substantially available nitrogen content.

In this specification, the term substantially is used to mean in the main and numerically two-thirds or more. Nonpolymeric means containing no molecules comprising more than five identical combining moieties units called monomers, herein denoting urea units. Base buffering materials comprise a weak acid and its conjugate base whose slightly basic pH changes only slightly on the addition, or "in-situ" formation, of moderate amounts of acid, and in the context of this specification maintains pH slightly higher than 7. Percent figures used are weight percent.

SUMMARY OF THE INVENTION

I have discovered a method that surprisingly provides for the substantially complete condensation reaction of about one part ammonia, two parts urea, and three parts formaldehyde at a base buffered pH slightly above 7, at a temperature of about 100° C., for 30 to 300 minutes to form an efficacious new nonpolymeric, storage stable, controlled release aqueous plant food composition.

DETAILED DESCRIPTION OF THE INVENTION

The effectiveness of the new method of preparing the new and efficacious liquid nonpolymeric controlled release nitrogen plant food composition of the instant invention by condensingly reacting ammonia, urea, and formaldehyde was surprisingly found to require mixing ammonia, urea, and formaldehyde in relative molecular amounts of about 1 to 2 to 3, respectively, in an aqueous solution containing sufficient base buffering material to maintain a minimum pH of about 7 in the solution. The molecular ratio was very important to the effectiveness of the method. Significant decreases in either the ammonia or formaldehyde relative ratios prevented the substantial completion of the condensation reaction and left foliage burning amounts of unreacted urea and/or ammonia in the plant food composition.

To perform the method effectively and leave little unreacted ammonia, urea, and formaldehyde, it is necessary to heat the aqueous mixture to at least about 100° C. at a minimum pH of about 7 for a period of time between 30 and 300 minutes until the condensation reaction is substantially complete and an aqueous nonpolymeric liquid controlled release nitrogen plant food is formed.

The primary reaction is carried out in aqueous solution and about one molecule of water is formed per molecule of formaldehyde reacted in the method, so that it is necessary to concentrate the liquid plant food by evaporating sufficient water until the nitrogen content is in the practical and storage stable range between 20 and 30 percent. Concentrations below 20 percent exhibit reduced storage stability and are economically undesirable, while the molecular structure of the combined ammonia, urea, formaldehyde, and base buffer does not accommodate nitrogen concentrations higher than 30 percent.

Although the new liquid plant food is surprisingly storage stable at elevated temperature after the condensation reaction is completed, it is necessary to cool it to about room temperature before formation of polymers containing more than three urea moieties occurs. If the new plant food is stored for extended periods of time at elevated temperatures, polymerization of the condensed molecules occurs and insoluble solids undesirably form, which comprise polymers containing more than three urea moieties.

The method is most effective and the resulting liquid plant food is safest from causing phytotoxicity when the condensation reaction between ammonia, urea, and formaldehyde is substantially completed so that the nitrogen from unreacted ammonia and urea in total amounts to less than 5 percent of the concentrated aqueous nitrogen plant food. This level of low free ammonia and urea is best achieved when the molecular ratio of ammonia, urea, and formaldehyde is held in the range between 1 and 1.5, 2 and 2.5, and 3.0, respectively. Unreacted formaldehyde is desirably lower than 0.1 percent so long as the formaldehyde moieties are less than the total of urea and ammonia moieties.

Alkali metal carbonates are effective base buffering materials in the instant invention and sodium bicarbonate is the preferred base buffer because of its effective buffer capacity and its relatively low cost and handling safety. The method works most effectively when the aqueous solution wherein the condensation reaction is performed contains sufficient base buffering material to maintain pH between 7 and 8 throughout the condensation reaction period. Best condensation reaction conversion and elimination of ammonia, and urea is obtained in the method when the mixture is heated to a temperature of between 98° and 110° C., held at a pH between 7 and 8 for a period of time between 30 and 300 minutes, and evaporated until its nitrogen concentration is between 24 and 29 percent.

It was discovered that the instant invention can convert a majority of the nitrogen of the nonpolymeric aqueous liquid nitrogen plant food to 5-methyleneuriedo-2-oxohexahydro-s-triazine when the molecular ratios of ammonia, urea, and formaldehyde are held closely to 1, 2, and 3, respectively, pH is held between 7 and 8 and reaction temperatures are held between 100° and 110° C. until the condensation reaction is substantially complete.

Urea formaldehyde concentrates, such as the commercially available UFC-85, containing formaldehyde and urea combined primarily are methylolureas, plus free formaldehyde, in a molecular ratio of about 5/1, may be effectively used in the instant process as a substitute for the formaldehyde and part of the urea. Such a material is preferred because of its safety and ease of handling.

The instant method provides a new and previously undisclosed nonpolymeric aqueous liquid controlled release nitrogen plant food exhibiting low foliar phytotoxicity and high storage stability. The preferred composition contains less than 6 percent unreacted urea nitrogen, less than 1 percent unreacted ammonia nitrogen, and less than 0.01 percent unreacted formaldehyde. Phytotoxicity is about like other liquid urea formaldehyde fertilizers when higher concentrations of ammonia and urea are included in a composition, although lower than ordinary mineral nitrogen fertilizer phytotoxicities.

Some variations in the instant method is allowable, as described in the foregoing paragraphs, in the preparation of efficacious nonpolymeric aqueous liquid plant food. Best results in terms of low unreacted ammonia and urea content, low phytotoxicity and storage stability of the product are obtained holding the reaction conditions at those of the preferred method.

In the preferred method of preparing a nonpolymeric aqueous controlled releasing nitrogen plant food by condensingly reacting ammonia, urea, and formaldehyde, ammonia, urea, and aqueous formaldehyde are first admixed in a molecular ratio of about 1, 2, and 3, respectively in aqueous alkali metal bicarbonate sufficient to maintain the pH of the mixture between 7 and 8. While maintaining pH between 7 and 8, the aqueous mixture is heated to a temperature between 102° and 106° C. for a period of time between 45 and 70 minutes until a condensation reaction occurs between the ammonia, urea, and formaldehyde, and is substantially completed so that remaining unreacted ammonia and urea nitrogen in total a amount to less than about 4 percent of the condensed liquid controlled release nitrogen plant food.

In the preferred method, the condensed liquid controlled release nitrogen plant food is concentrated by evaporating water until its nitrogen content is increased to an economical and storage stable nitrogen content of between 25 and 29 percent. The liquid plant food is stable enough to allow concentration at atmospheric pressure or, if more convenient, it may be done at reduced pressure.

In the preferred method, the condensed liquid controlled release nitrogen plant food is cooled for storage at about room temperature and a pH of between 7 and 8.5 to maintain concentration of polymers containing more than three urea moieties to a level between 0 and 3 percent. It is usually not necessary to add additional base buffer to achieve the pH required for optimum storage stability. Additional base may be added to the concentrate if desired to achieve optimum storage stability.

By close control of the operating parameters described in the foregoing preferred method, the condensation reaction may be carried out so that 5-methyleneuriedo-2-oxohexahydro-s-triazine comprises between 50 and 75 percent of the nitrogen in the nonpolymeric aqueous liquid controlled release plant food.

A nonpolymeric aqueous liquid controlled release plant food composition may be prepared by the foregoing preferred method which is unique and provides especially safe, and highly available nitrogen as a foliar plant food composition. This new foliar feed compostion contains between 0 and 4 percent unreacted urea nitrogen, between 0 and 0.1 percent unreacted ammonia, and less than 0.01 percent unreacted formaldehyde so that it is safe for use on foliage.

PRESENTLY PREFERRED MODES OF OPERATION OF THE INVENTION

Having described the basic concepts of the instant invention, reference is now made to the following examples which illustrate the presently preferred embodiments of the invention.

EXAMPLE 1

To a stainless steel reactor having an internal volume of 23000 liters, equipped with a turbine mixer with wall baffles, internal coils and wall jacket for heating with steam and cooling with water, and a condenser reflux recycling system with a steam jet system for vacuum evaporation, reaction ingredients required in the method were admixed at ambient temperature in the order listed as follows:

| Ingredients | Weight, kilograms |
| --- | --- |
| UFC-85, 60HCHO-25 UREA | 11,036 |
| Aqua NH$_3$, 21-0-0 | 5,209 |
| Sodium Bicarbonate | 300 |
| Urea, 46-0-0 | 6,073 |
| Total | 22,618 |

The admixture was heated to a temperature of 101° C. with vigorous stirring with the base buffering sodium bicarbonate maintaining the pH between 7.4 and 8.3 during the condensation reaction period continued for 68 minutes at atmospheric pressure. Temperature was controlled by returning condensate to the reactor and by cooling through the reactor wall and heating was done by steam in the internal coils.

The condensation reaction product was concentrated by applying vacuum to the system and evaporating 4436 kilograms of water and not returning the condensate to the system, leaving 18182 kilograms of concentrate, which was cooled to 43° C. in the reactor and discharged to a product holding tank for analysis and use.

Analysis of the concentrated nitrogen liquid plant food was determined by Kjeldahl and high performance liquid chromatographic methods and the results are tabulated as follows:

| Component | | Wt % |
| --- | --- | --- |
| Total nitrogen, N | | 27.90 |
| Polymers, containing 3 or more urea units, as N | | 0.0 |
| Hexamethylene tetramine, as N | | 0.0 |
| Methylene diurea, as N | | 0.74 |
| Dimethylene triurea, as N | | 0.08 |
| Ammonia, as N | less than | 0.10 |
| Urea, as N | | 4.14 |
| Formaldehyde | less than | 0.01 |
| 5-Methyleneuriedo-2-oxohexahydro-s-triazine, as N | | 22.44 |
| Other, nonpolymeric condensed compounds, as N, by diff. | | 0.40 |

| Component | Wt % |
| --- | --- |
| Total, N | 27.90 |

EXAMPLE 2

Tests to determine the availability of nitrogen from the liquid plant food of Example 1 compared to those of other well known commercial nitrogen products were made in growth chambers containing rye grass in 2200 ml of Hoagland's Solution. The test nitrogen source was substituted into the otherwise unchanged standard Hoagland's Solution and amounted to 35 milligrams of nitrogen. The nitrogen was added every 5 days after the rye grass clippings were harvested to a height of 4 centimeters above the top of the growth chambers. The temperature in the chambers was maintained at 20°–21° C. throughout the 25 day test period. The clippings were each analyzed for nitrogen and the results tabulated as follows:

| N Source | Nitrogen Content in Clippings, mg/chamber | | | | | N Recovery total, % |
| --- | --- | --- | --- | --- | --- | --- |
| | 5 days | 10 days | 15 days | 20 days | 25 days | |
| Product from Example 1 | 26 | 20 | 18 | 20 | 21 | 60 |
| Urea | 30 | 25 | 28 | 27 | 25 | 77 |
| Solid Ureaform (Blue Chip) | 22 | 11 | 10 | 8 | 6 | 33 |

The recovery of the nonpolymeric condensed liquid composition prepared in Example 1 in 25 days was almost as high as that of very active and phytotoxic urea, but about twice as available as polymeric ureaform fertilizer in 25 days.

EXAMPLE 3

A field test was made to determine nitrogen efficacy and phytotoxicity of the nonpolymeric condensed product of Example 1 in comparison with other commercially available liquid foliar nitrogen plant foods. A test site was selected where Merion Kentucky Bluegrass turf was growing on a medium loam soil. The experimental design was a randomized complete block design with three replications. Plot size was 4 by 4 feet. Each nitrogen treatment provided 4 pounds N per 1000 square feet per growing season and the annual amount was divided into 2 equal applications. The liquid applications were applied at a rate of 4 gallons per 1000 square feet when several days of clear weather was forecast. Irrigation was applied to prevent the plots from going dormant and clippings were removed at a 1½ inch cutting height. Foliar damage was determined 3 days after each application with ratings of 10 indicating complete burn of the foliage and 0 no foliage damage. The results of the phytotoxicity tests are tabulated as follows:

| Nitrogen Source | Phytotoxicity Rating, Average | |
| --- | --- | --- |
| | July | September |
| Product of Example 1 | 0 | 0 |
| Urea | 2 | 2 |

I claim:

1. A method of preparing aqueous a new and efficaceous liquid nonpolymeric, controlled release, nitrogen plant food composition by condensingly reacting ammonia, urea, and formaldehyde, comprising:
    (a) admixing ammonia, urea, and formaldehyde in a molecular ratio of about 1, 2, and 3, respectively, in aqueous solution containing sufficient base buffering material to maintain a minimum pH of about 7;
    (b) heating the admixture to a temperature of about 100° C. at a minimum pH of about 7 for a period of time between 30 and 300 minutes, until a condensation reaction between ammonia, urea, and formaldehyde is substantially complete, to form an aqueous nonpolymeric liquid controlled release nitrogen plant food:
    (c) evaporatingly concentrating the aqueous nitrogen plant food until its nitrogen content is between 20 and 30 percent; and
    (d) cooling the concentrated aqueous nitrogen plant food to about room temperature before formation of polymers containing more than 3 urea moieties occurs.

2. The method of claim 1 wherein the condensation reaction between ammonia, urea, and formaldehyde is substantially completed so that unreacted ammonia and urea nitrogen, in total, amount to less than 5 percent of the concentrated aqueous nitrogen plant food.

3. The method of claim 1 wherein the molecular ratio of ammonia, urea, and formaldehyde is between 1 and 1.5, 2 and 2.5, and 3.0, respectively.

4. The method of claim 1 wherein the base buffering material is an alkali metal carbonate.

5. The method of claim 1 wherein the base buffering material is sodium bicarbonate.

6. The method of claim 1 wherein the aqueous solution contains sufficient base buffering material to maintain pH between 7 and 8.

7. The method of claim 1 wherein the admixture is heated to a temperature between 98° and 110° C.

8. The method of claim 1 wherein the admixture is heated to a pH between 7 and 8 for a 30 to 70 minute period.

9. The method of claim 1 wherein the condensed liquid controlled release nitrogen fertilizer is evaporatingly concentrated until its nitrogen content is between 24 and 29 percent.

10. The method of claim 1 wherein 5-methyleneuriedo-2-oxohexahydro-s-triazine comprises a majority of the nitrogen in the nonpolymeric aqueous liquid controlled release nitrogen plant food.

11. The method of claim 1 wherein the formaldehyde in the admixture is supplied as a partially condensed aqueous methylolurea concentrate.

12. A nonpolymeric aqueous liquid controlled release nitrogen plant food composition exhibiting low phytotoxicity and high storage stability, containing less than 6 percent unreacted urea nitrogen, less than 1 percent unreacted ammonia nitrogen, and less than 0.01 percent unreacted formaldehyde, prepared by the condensation reaction of claim 1.

13. A method of preparing a nonpolymeric aqueous liquid controlled release nitrogen plant food by condensingly reacting ammonia, urea, and formaldehyde, comprising:
    (a) admixing ammonia, urea, and aqueous formaldehyde-urea concentrate in a molecular ratio of about 1 ammonia, 2 urea, and 3 formaldehyde, in aqueous solution containing alkali metal bicarbonate sufficient to maintain pH between 7 and 8;
    (b) heating the admixture to a temperature between 102° and 106° C. at a pH between 7 and 8 for a 45 to 70 minute period until a condensation reaction occurs between ammonia, urea, and formaldehyde and is substantially completed so that remaining unreacted ammonia, and urea nitrogen in total amount to less than about 4 percent of the condensed liquid controlled release nitrogen plant food;
    (c) evaporatively concentrating the condensed liquid controlled release nitrogen plant food until its nitrogen content is between 25 and 29 percent; and
    (d) cooling the condensed liquid controlled release nitrogen plant food for storage at about room temperature and a pH between 7 and 8.5 to maintain concentration of polymers containing more than 3 urea moieties between 1 and 3 percent.

14. The method of claim 13 wherein 5-methyleneuriedo-2-oxohexahydro-s-triazine comprises between 50 and 75 percent of the nitrogen in the nonpolymeric aqueous liquid controlled release nitrogen plant food.

15. A nonpolymeric aqueous liquid controlled release nitrogen foliar plant food composition exhibiting high nitrogen availability as plant food and safe from damaging treated plants, containing between 0 and 4 percent unreacted urea, between 0 and 0.1 percent unreacted ammonia, and less than 0.01 percent unreacted formaldehyde, prepared by the method of claim 13.

* * * * *